United States Patent
Kelly et al.

(10) Patent No.: US 7,869,691 B2
(45) Date of Patent: Jan. 11, 2011

(54) APPARATUS FOR RECORDING A MAIN FILE AND AUXILIARY FILES IN A TRACK ON A RECORD CARRIER

(75) Inventors: Declan Patrick Kelly, Eindhoven (NL); Wilhelmus Jacobus Van Gestel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1016 days.

(21) Appl. No.: 10/528,934

(22) PCT Filed: Sep. 25, 2003

(86) PCT No.: PCT/IB03/04189

§ 371 (c)(1),
(2), (4) Date: Mar. 23, 2005

(87) PCT Pub. No.: WO2004/029959

PCT Pub. Date: Apr. 8, 2004

(65) Prior Publication Data

US 2006/0072905 A1    Apr. 6, 2006

(30) Foreign Application Priority Data

Sep. 26, 2002    (EP) .................................. 02079056

(51) Int. Cl.
*H04N 7/00* (2006.01)
(52) U.S. Cl. .............................. 386/95; 386/46; 386/98
(58) Field of Classification Search ............... 386/46, 386/95, 98, 70
See application file for complete search history.

(56) References Cited

U.S. PATENT DOCUMENTS

| 5,651,087 | A | * | 7/1997 | Nagano et al. ............... 386/51 |
| 5,745,643 | A | * | 4/1998 | Mishina ...................... 386/106 |
| 5,870,523 | A | * | 2/1999 | Kikuchi et al. ................ 386/95 |
| 5,902,115 | A | * | 5/1999 | Katayama ............... 434/307 A |
| 5,913,010 | A | * | 6/1999 | Kaneshige et al. ............ 386/70 |
| 7,200,073 | B2 | * | 4/2007 | Auwens et al. .......... 369/30.04 |
| 2002/0090206 | A1 | * | 7/2002 | Kikuchi et al. .............. 386/111 |

FOREIGN PATENT DOCUMENTS

| EP | 0831647 A1 | 3/1998 |
| EP | 0831647 B1 | 2/2002 |
| EP | 0831647 B9 | 2/2002 |

\* cited by examiner

*Primary Examiner*—Thai Tran
*Assistant Examiner*—Mishawn Dunn

(57) ABSTRACT

The invention relates to an apparatus for recording a main file comprising a main information signal and auxiliary files comprising auxiliary signals in a track on a record carrier. The apparatus writes in a first location a block of an auxiliary file comprising a part of an auxiliary information signal having a specific presentation time, in a second location a subsequent block of the corresponding auxiliary file and in at least one location between the first and second location at least one block of the main file comprising a part of the main information signal having a presentation time which corresponds to the presentation time of the auxiliary information signal to be written in the first location. In this way the respective files are interleaved written on the record carrier such that the jumping time between subsequent read actions is significantly reduced. This results in an increase of the effective read bit-rate of a playback device.

10 Claims, 3 Drawing Sheets

Figure 1:
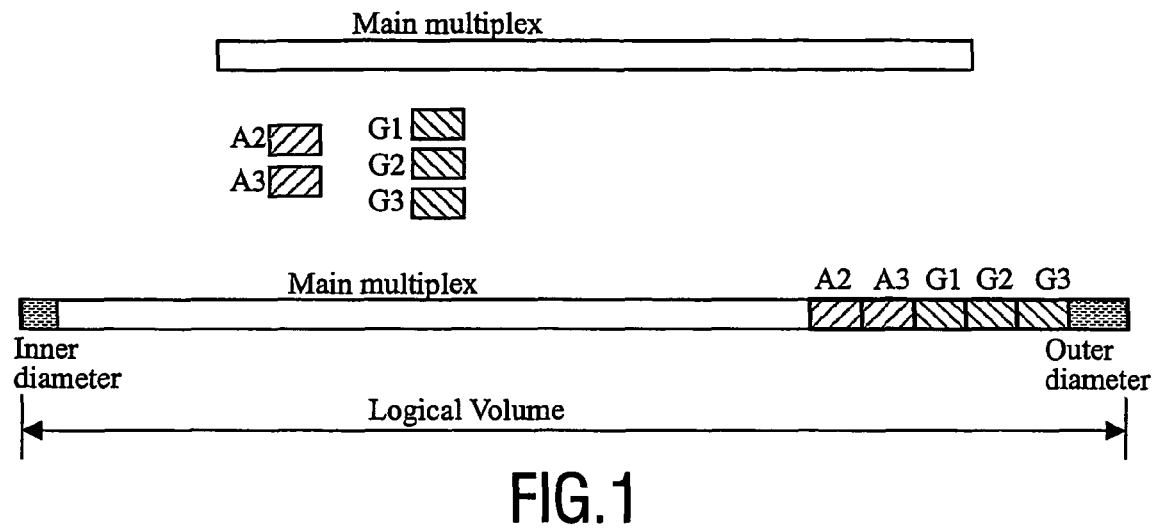

APPARATUS FOR RECORDING A MAIN FILE AND AUXILIARY FILES IN A TRACK ON A RECORD CARRIER

The present invention relates in general to the field of recording information on a record medium.

More particularly, the present invention relates to the field of optical recording, in which case the record medium typically is an optical disc, but the gist of the present invention is not restricted to optically recording information on a disc.

Further, the present invention relates particularly to the field of recording an audio stream and/or a video stream, but the gist of the present invention is not restricted to such use. As will become clearer in the following, the present invention is applicable in more cases where an information stream has a basic part, a main file, and one or more optional parts, auxiliary files.

Optical discs and disc drives have been developed according to different standards or formats, such as for instance CD standard, DVD standard, etc. A relatively new standard is BD (Blu-Ray Disc). Specifically, the present invention relates to the field of recording and reading BD-ROM, and the invention will be explained hereinafter specifically for this exemplary application, but it is to be noted that it is not intended to restrict the scope of the invention to BD-ROM.

The invention relates to an apparatus for recording a main file comprising a main information signal and auxiliary files comprising auxiliary information signals in a track on a record carrier, so as to enable simultaneous presentation of the main information signal and at least one of the auxiliary information signals, said track comprising a series of locations, said apparatus comprises:
  first receiving means for receiving said main file;
  second receiving means for receiving said auxiliary files;
  first processing means for subdividing the main file into a sequence of main blocks, each block comprising a part of the main information signal having a specific presentation time;
  second processing means for subdivide each auxiliary file into a sequence of auxiliary blocks, each block comprising a part of an auxiliary information signal having a specific presentation time.

The invention further relates to a method for recording a main file and auxiliary files in a track on a record carrier. The invention further relates to record carrier carrying a main file and auxiliary files As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacturing, which information can only be read by a user. The optical storage disc may also be a writeable type, where information may be stored by a user. Since the technology of optical discs in general, the way in which information can be stored in an optical disc, and the way in which optical data can be read from an optical disc, is commonly known, it is not necessary here to describe this technology in more detail.

Optical discs have found widespread use as information carrier, not only for storing computer data, but also for making audio and/or video recordings. Apparatus are available for allowing a user to make his own recordings on writeable discs. Also, audio publishing companies or video publishing companies publish pre-recorded discs, which are read-only discs (ROM); play-back apparatus are available for allowing a user to play such discs. In such play-back apparatus, indicated hereinafter simply as player, a disc drive component reads and decodes the data recorded on disc, and a video stream and/or audio stream is generated, suitable for display via a display device such as a television apparatus, a monitor, a loudspeaker, etc. This is explained in the following example.

A movie may contain several elements, indicated as follows:
  Moving pictures, i.e. the actual pictures of the movie, to be displayed on the TV screen. The contents of the moving pictures are stored in a video elementary stream. It is possible that a disc contains multiple alternative video elementary streams, for instance to allow a user to view scenes from different angles, but this is not relevant for the present invention and will be ignored in the following discussion: it is assumed that there is only one video elementary stream.
  Graphics pictures. Graphics pictures are overlayed on the moving pictures like a picture-in-picture presentation. Graphics picture are used for transmitting subtitles. They may consist of background graphics (e.g. a still picture) and some text. The contents of the graphics pictures are stored in a graphics elementary stream, separate from the video elementary stream, so a user has the option of viewing the movie with or without graphics. Usually, a user is given the option to choose a language, in which case different graphics pictures are provided, associated with different languages. In such case, the movie is accompanied with a set of multiple graphics elementary streams, one for each language.
  Audio signals. The audio signal of a movie consists of background audio and spoken text, and this combination is stored in an audio elementary stream, separate from the video elementary stream. Usually, a user is given the option to choose a language, in which case the spoken text is different for different languages while the background audio is the same for all languages. In such case, the movie is accompanied with a set of multiple audio elementary streams, one for each language.

A combination of multiple elementary streams (for instance: moving pictures+graphics+audio) can be transmitted in one Transport stream. Each transport stream is stored as a separate file.

Traditionally, an information carrier contains only one version of the movie. With the ongoing development of optical discs, especially the increase in data storage capacity, it has become possible for the information carrier to contain two or more versions of the movie, allowing a user to select which version he wishes to see. For instance, one user may wish to see the movie in its original version, but another user may wish to have subtitles. Yet another user may prefer to hear the spoken text in his own language.

According to the state of the art, especially the well-known DVD-VIDEO standard, several different versions of the audio elementary stream and the graphics elementary stream are recorded in one transport stream, packets of the elementary streams being multiplexed in the transport stream. During playback the whole transport stream is read and depending on a user's choice, only one of the several different versions of the audio elementary stream is presented during playback, and only one of the several different versions of the graphics elementary stream is presented during playback.

One disadvantage of this approach is that it consumes relatively much storage space. For instance, consider a case where an original English-language movie is to be published with optional French-spoken text and optional German spoken text. In that case, a first audio elementary stream would contain the combination of background sound and original English-spoken text, a second audio elementary stream would contain the combination of background sound and French-spoken text (translation 1), and a third audio elementary stream would contain the combination of background sound and English-spoken text (translation 2). Thus, the information relating to the background sound, common to all three audio transport streams, is recorded three times.

Likewise, consider a case where a movie is to be published with English, French and German subtitles on a common background graphics still picture. In that case, a first graphics elementary stream would contain the background still picture plus the English text, a second graphics elementary stream would contain the background still picture plus the French text, and a third graphics elementary stream would contain the background still picture plus the German text. Thus, the information relating to the background still picture, common to all three graphics elementary streams, is recorded three times.

Another disadvantage of the current approach is that all elementary streams are collected in one transport stream. During playback all information has to be read, including the non-used elementary streams. This increases the bit rate during playback and with a lot of different languages for audio and subtitling, the bit rate might become too high. Furthermore a disadvantage is that if a publisher would like to add an additional language to the transport stream, he has to generate a new transport stream which should comply with the MPEG constraints according to the MPEG standard. The generation of a transport stream needs a lot of computation power and is not necessarily without errors. This could result in perturbations in the original video content.

There are two methods used to store this information. In the first method applied in DVD, a movie contains multi-language audio and/or multi-language subtitles. The main video stream, audio elementary streams and subtitle elementary streams are combined into one main multiplex stream which is stored as one file on the record carrier. When reproducing this main multiplex stream comprising the information signal from all the combined signals has to be read from the record carrier. Only the selected audio language and subtitle stream and the main video stream are used from the composite stream to be decoded. Thus some elementary streams are read but not used. The required buffer size in the reproducing apparatus has to be increased and the playback bit rate is higher than needed. It might even be possible that if the producer of the record carrier would like to make a main multiplex stream comprising all possible audio languages and subtitles, the playback rate of said main multiplex will be too high.

According to the other method the elementary streams of a movie are recorded on the disc as separate files. FIG. 1 discloses an example of a record carrier obtained with said method. The record carrier is an optical disc with a recording track. In this example a main multiplex file comprising the original video stream and original audio stream, two audio streams for two other languages and three graphic streams comprising the subtitles for 3 languages are recorded on the record carrier. The logical Volume space is recorded from the inner diameter of the disc to the outer diameter of the disc. All the streams are contiguous written in the logical volume space. First the main multiplex is written, contiguously the two audio streams are written and finally the three subtitle streams are written in the track on the disc.

Figure 2:
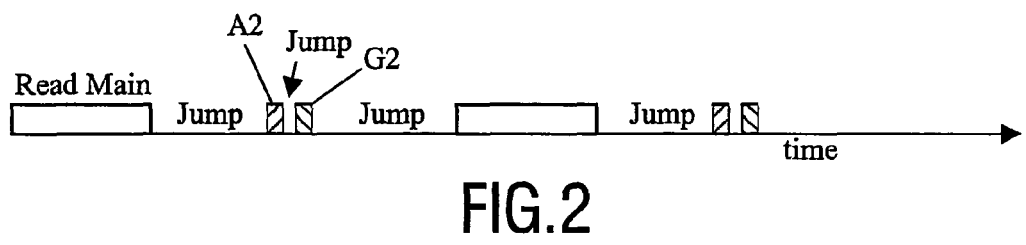

Prior to playing back the movie as recorded in FIG. 1, a user has to select which language the audio should be and whether he would like to have subtitles. For example one of the languages A2 or A3 and/or one of the Graphics comprising subtitles G1, G2 or G3 is selected. During playing back the movie, jumps have to be made from a location in the Main multiplex to a location in the A2-A3 and/or G1-G2-G3 file and back to the Main multiplex. These are jumps over large distances in the beginning as the beginning of the main elementary stream are written at the inner side of the disc and the audio and graphics files are at the outer side of the disc. A long time interval for reading information from the disc is lost with jumping forward and backward. This decreases the sustained bit rate. The buffer sizes have to be increased so as to survive the jump with no underflow in one of the mainstream, audio or graphics buffers. FIG. 2 discloses schematically the effective reading time of the reading units in a reproducing device. As can be seen a lot of time is wasted by the large jumps from the main multiplex stream to the audio file and from the graphics file back to the multiplex stream. The be able to read all needed information from the record carrier, the reading unit should have a reading bit rate which is higher then the sum of the bit rates of the individual streams to be read.

It is an important objective of the present invention to overcome said disadvantages.

It is an object of the invention to provide an arrangement with improved recording method for recording a main file and auxiliary files without the disadvantage of the need for a reading unit having a reading bit rate that is substantially higher then the bit rate needed to be able to read the main file and the selected auxiliary files.

The arrangement in accordance with the invention comprises
first receiving means for receiving said main file;
second receiving means for receiving said auxiliary files;
first processing means for subdividing the main file into a sequence of main blocks, each block comprising a part of the main information signal having a specific presentation time;
second processing means for subdivide each auxiliary file into a sequence of auxiliary blocks, each block comprising a part of an auxiliary information signal having a specific presentation time;
writing means for writing in said track of the record carrier in a first location a block of an auxiliary file comprising a part of an auxiliary information signal having a specific presentation time, in a second location a subsequent block of the corresponding auxiliary file and in at least one location between the first and second location at least one block of the main file comprising a part of the main information signal having a presentation time which corresponds to the presentation time of the auxiliary information signal to be written in the first location.

The apparatus according to the invention generated a record carrier having a main file and auxiliary files recorded on it having the following characteristics: The subsequent blocks of an auxiliary file are written in succession in the track. Between two subsequent blocks of said auxiliary file, blocks or at least one block of the main file are written that have a presentation time which corresponds to the presentation time of the auxiliary signal in the block of said auxiliary file that precedes said blocks or said at least one block. In other words the parts of the corresponding files are interleaved on the disc. When the movie is played back then only relatively small jumps have to be made as the blocks of the respective files which comprises a part of the signal having a similar representation time are recorded in the track of the record carrier near to each other. As soon as one of the buffers is almost empty, a new block of the corresponding file has to be read. This new block will be near to the position of the last block read as this should have a part of the signal having a corresponding representation time. As only small jumps are needed, the reading unit doesn't wasted a lot of time for making jumps and could therefore read more efficiently information from the record carrier. This results in an increase of the effective bit-rate of reading unit. Due to this the total bit-rate of the Main Multiplex transport stream and all auxiliary signals to be read can be much higher then when making large jumps. An additional advantage is that the buffer size of the respective buffers can be smaller, as the access time to the subsequent blocks to be read is smaller.

Figure 3:
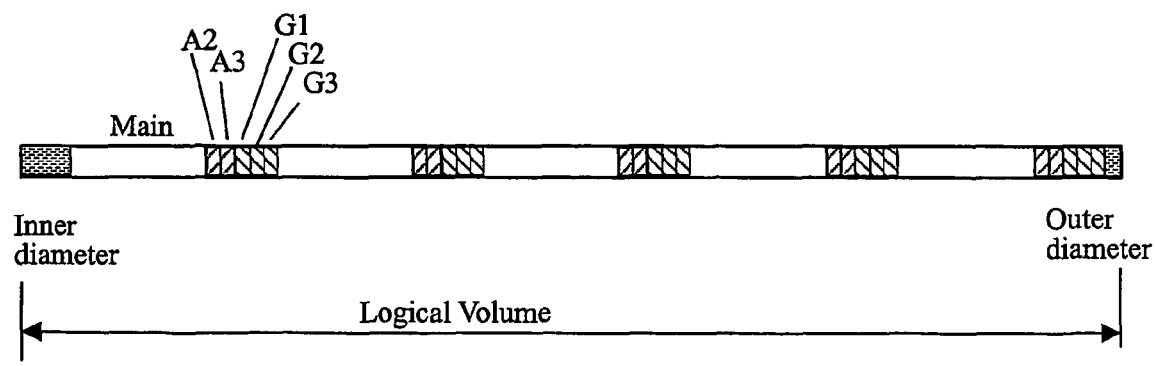
Figure 4:
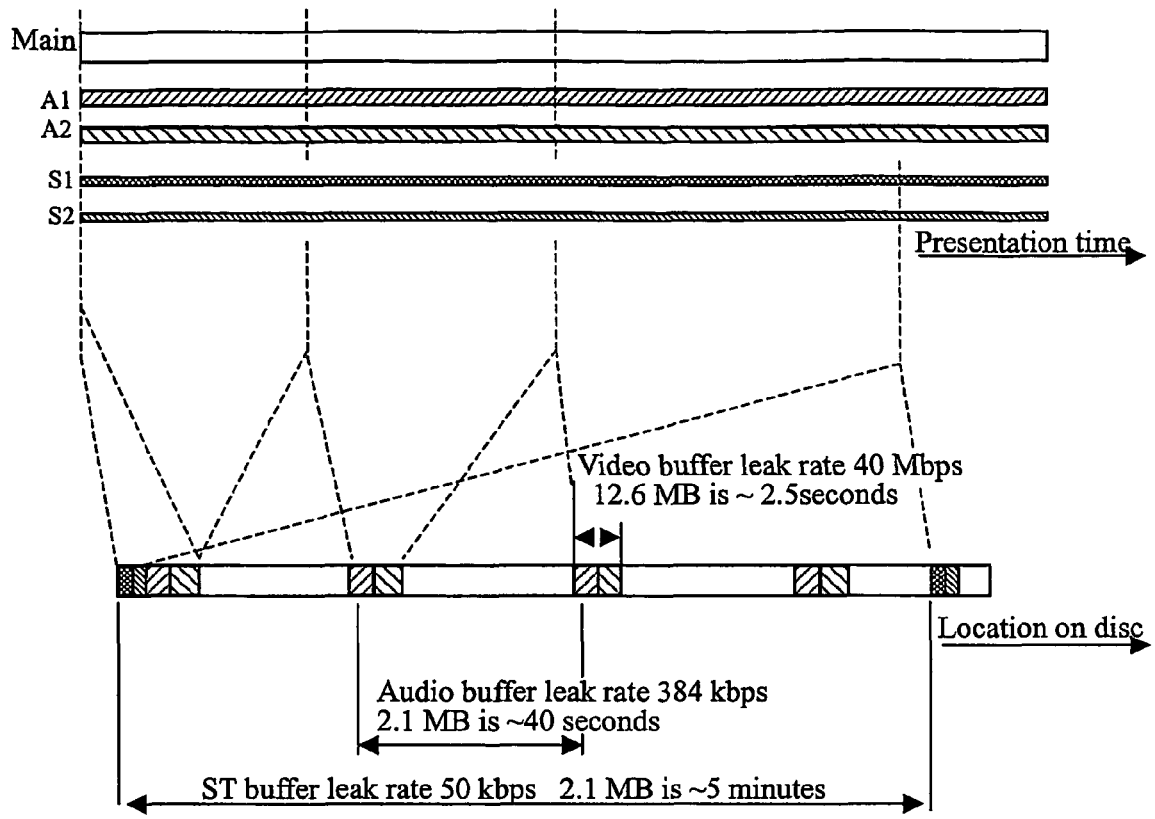
Figure 6:
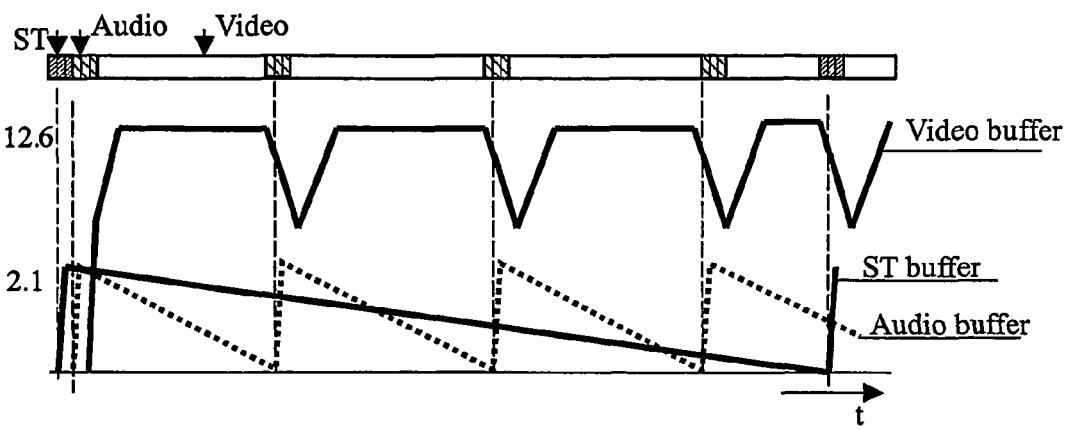
Figure 5:
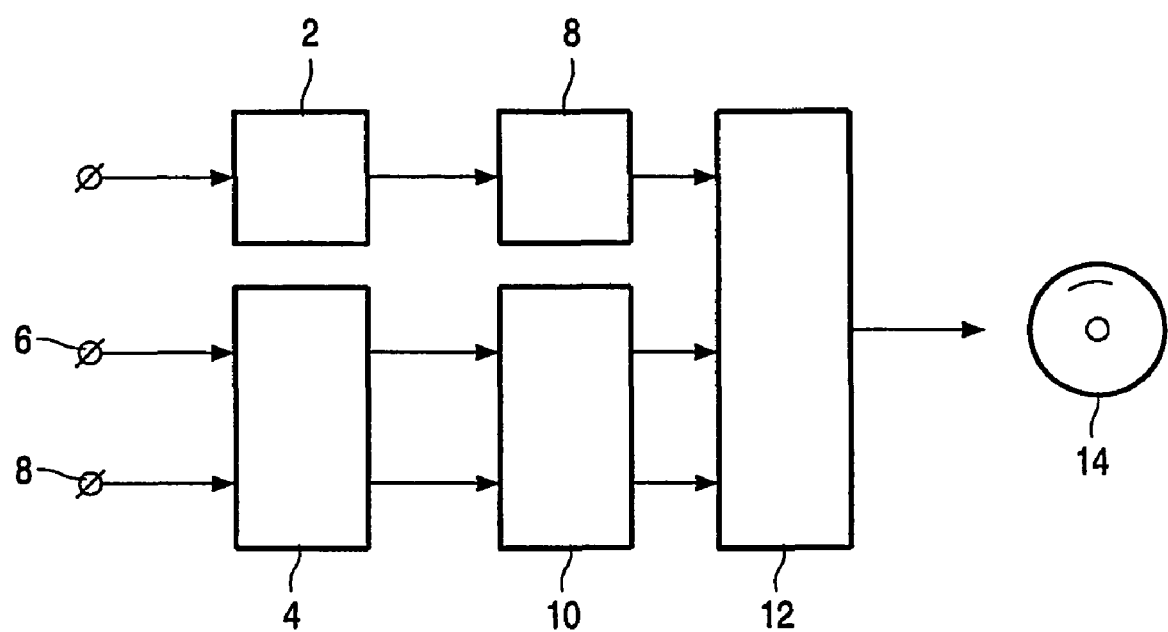

Embodiments of the invention will now be described in more detail, by way of example, with reference to the drawings, in which FIG. 1 shows schematically the storage of a main multiplex and auxiliary files on a record carrier, FIG. 2 shows a time line with the reading periods and jump periods when reading from a record carrier according to FIG. 1, FIG. 3 shows schematically the storage of a main multiplex and auxiliary files on a record carrier according to the invention, FIG. 4 shows the relation between the presentation time of the main information signal and the auxiliary information signals and the corresponding location on the record carrier, FIG. 5 shows schematically an recording apparatus according to the invention, and FIG. 6 shows a time diagram with the relation between the record carrier to be read and the filling rate of the corresponding buffers.

FIG. 1 shows schematically the storage of a movie comprising a main multiplex and auxiliary files on a record carrier. The record carrier is preferably an optical disc. The main multiplex file is obtained by combining the video signal and the original audio signal. The original audio signal comprises normally the sound recorded during the recording of the video signal. The main multiplex file is contiguous recorded on the record carrier. Furthermore, are present on the record carrier two additional audio signals in separate audio files (A2, A3), and the subtitles for three languages in three graphics files (G1, G2, G3). In FIG. 1 the auxiliary files are stored after the main multiplex file, so at the end in the logical volume of the disc. It should be noted that some or all of the auxiliary files could be stored prior to the main multiplex file. Normally, the beginning of the logical volume of a disc is at the inner diameter of the disc and the end of the logical volume of a disc is at the outer diameter of the disc.

When the movie is played back, the user first has to select whether or not he would like to listen the movie in one of the other languages and/or one of the subtitles. FIG. 2 shows a time diagram with the timing of read actions when reproducing the movie stored on the record carrier of FIG. 1 with one of the languages and one of the sub-titles. As can be seen from said time diagram jumps have to be made from a location in the main multiplex file to a location in one of the auxiliary files and back to the location in the main multiplex file. These jumps are over a large distance on the disc and will take a relatively long time between reading information from the main multiplex file and the auxiliary file. Jumps decrease the average reading bit-rate. As a consequence of the decreased average reading bit rate and the ineffective jump time the buffer size that is needed to survive the jumps with no underflow in one of the buffers. FIG. 2 represents first the reading of parts of the main multiplex file. Subsequent a jump is made to an auxiliary file, for example A2, comprising audio and a part of said auxiliary file is read. After that a small jump is made to an auxiliary file, for example G2, comprising graphics and a part of said graphics file is read. Finally a jump is made back to the location in the main multiplex file. This steps are repeated. As can be seen a lot of time is lost by jumping between a location in the main multiplex file and the auxiliary files.

FIG. 3 shows schematically the storage of a main multiplex and auxiliary files of a movie on a record carrier according to the invention. Parts or blocks of the main multiplex file and blocks of the auxiliary files, audio files and/or graphics files, are stored interleaved on the disc. When the movie is played back, repetitively, blocks of the main multiplex file and selected auxiliary files are read from the disc. Sequentially and in the same order as stored in the track on the record carrier, the main audio and selected auxiliary files are read from the record carrier. Now only small jumps has to be made over the blocks of auxiliary files that not has been selected by the user. By storing the files in this order the time lost with jumping is small and the average read bit rate is much higher than when reading a movie from a record carrier according to FIG. 1. As only small jumps have to be made, the average read-bit rate is higher and therefore, the total bit-rate of Main Multiplex file and all selected auxiliary files can be much higher. Furthermore the buffer size in a reproducing apparatus can be smaller. In FIG. 3 it is assumed that the bit rate of the auxiliary files and the block sizes are equal. Therefore, between parts of the main multiplex file are blocks all the auxiliary files are written. If the bit rate of for example the graphic signal is 2 times lower then the bit rate of the audio signal and the blocks of the auxiliary files are equal, then blocks of the audio file will be present between parts of the main multiplex file two times more then blocks of the graphics files.

The size of the blocks of main file and auxiliary file depends on the jump time as a function of the jump distance. Representative values for jump distance and corresponding jump time has been given in table-1.

TABLE 1

| Jump distance in BD-ROM | |
|---|---|
| Jump distance in ECC blocks | Jump time (Tj) in msec |
| 150 | 100 |
| 300 | 120 |
| 600 | 150 |
| 1.200 | 170 |
| 8.000 | 300 |
| 40.000 | 450 |
| >150.000 | 850 |

Other parameters that has to be taken into account:

Peak-rate of the reading a Video Elementary Stream is 40 Mbps (MPEG2 MP&HL). The average rate is much less (~20 Mbps) but for the worst case situation the peak-rate is important (peak-rate may occur for the whole duration of a scene which could take minutes).

HD-TV should be combined with high quality audio.

In case of AC3 encoding the maximum bit rate is 640 kbps,

In case of LPCM the number of bits per sample should be larger then 16 (preferably 24 bits/sample) and/or the sample frequency should be increased, as an example: 2 channel, 96 kHz sampling frequency and 24 bits/sample corresponds to a bit rate of 4.6 Mbps.

The maximum number of Audio channels is not limited to 2 or 6, but a number of 9 channels is already regarded suitable for some situations. It should be noted that not all audio channels need to have the highest quality. Multi-language audio channels could be encoded such that they have a lower bit rate. An optional high quality encoding method could be applied for the original audio, which is normally present in the transport stream stored in the Main multiplex file.

The maximum number of Subtitles or graphics files should not be limited. A number of 32 is already used for some movies. For a Sub title stream the average bit rate is 500 kbps.

Following scheduling buffers are expected to be present in a reproducing apparatus: a video buffer of 12.6 MByte, an audio buffer of 2.1 MByte and a graphics or subtitle buffer of 2.1 Mbyte.

The 12.6 MByte video buffer corresponds to the size of a part of the main multiplex file that has to be written contiguous in a track. With a buffer leak rate of 40 Mbps this corresponds to 2.5 seconds of video. An amount of 12.6 MByte corresponds to 198 ECC blocks in the track of the record carrier.

The 2.1 Mbyte audio buffer corresponds to the size of a part or block of the audio file that has to be written contiguous in a track. With a buffer leak rate of 384 kbps this corresponds to about 40 seconds of audio. An amount of 2.1 MByte corresponds to 33 ECC blocks on the record carrier.

The 2.1 Mbyte graphics or sub-title buffer corresponds to the size of a part or block of the audio file that has to be written contiguous in a track. With a buffer leak rate of 50 kbps this corresponds to about 5 minutes of subtitles. An amount of 2.1 MByte corresponds to 33 ECC blocks on the record carrier.

FIG. 4 shows the relation between the presentation time of the main information signal and the auxiliary information signals and the corresponding location on the record carrier. On top of this figure schematically are shown the main transport stream and auxiliary streams to be stored. Main refers to the main transport stream. A1 and A2 refers to a first and second additional audio streams. S1 and S2 refers to a first and second additional sub-title stream. The width of the bars are indicative for the bit-rate. The bar from the left to the right is indicative for the presentation time of the respective streams. According to this figure the main stream and audio streams are divided in parts of presentation time such that a part of the audio stream can be stored in a block of 2.1 MByte, which corresponds to about 40 seconds of audio. Subsequently the sub-title streams are divided in parts of 2.1 MByte, which corresponds to about 5 minutes of sub-titles. According to the invention the streams are stored in separate files, where each file has to be accessed via the directory information, which is used by the file system running on the reproducing apparatus.

Further shows FIG. 4 where the respective parts of the streams are stored. According to FIG. 4, first the first subtitle parts are stored in the track. Subsequently the first parts of the audio streams are stored in the track and next to said first parts of the audio stream the part of the main transport stream having a presentation time which corresponds to the presentation time of the audio stream is stored in said track. After this, repetitively a subsequent part of the audio streams and contiguously the corresponding part of the main transport stream are stored in the track. A subsequent part of the sub-title stream is stored in a location such that the part of the main transport stream stored in a location preceding said location has a presentation time which is lies in the presentation time interval of the preceding part of sub-title stream stored in the track, and the part of the main transport stream stored in a location subsequent said location has a presentation time which is lies in the presentation time interval of the part of sub-title stream stored in the current location of the track. It should be noted that the main transport stream is divided in blocks of 12.6 MByte, which is much smaller then the part of the main transport stream stored between two part of the audio stream. Therefore, blocks of the audio streams and blocks of the sub-title streams does not necessarily be stored subsequently as in the beginning of the track. As can be seen from FIG. 4 all parts of the auxiliary files having the same presentation time interval are stored together after each other.

FIG. 5 shows schematically an recording apparatus according to the invention. The recording apparatus comprises a first receiving unit 2 for receiving the file comprising the main transport stream and a second receiving unit 4 for receiving the auxiliary files. Said second receiving unit comprises a first input 6 for receiving the files comprising the respective additional audio elementary streams to be stored and a second input for receiving the files comprising the respective additional graphics or sub-title elementary streams to be stored. The file comprising the main transport stream is supplied to a first processing unit 8 for subdividing the main file into a sequence of main blocks, each block comprising a part of the main information signal having a specific presentation time. With reference to FIG. 4, a main block has a size of 12.6 MByte. The received auxiliary files are supplied to a second processing unit 10 for subdividing each auxiliary file into a sequence of auxiliary blocks, each block comprising a part of an auxiliary information signal having a specific presentation time. With reference to FIG. 4, a block of the audio files has a size of 2.1 MByte and a block of the sub-title files is 2.1 MByte. It should be noted that the blocks of the audio files and the sub-title files have equal sizes. Depending on the characteristics of the reproducing device, for example the bit read-rate, and/or recording medium, such as the size of an ECC block, other block size could be suitable. The sequence of main blocks and sequences of blocks of auxiliary files are supplied to a writing unit 12 for writing in a track of the record carrier 14 in a first location a block of an auxiliary file comprising a part of an auxiliary information signal having a specific presentation time, in a second location a subsequent block of the corresponding auxiliary file and in at least one location between the first and second location at least one block of the main file comprising a part of the main information signal having a presentation time which corresponds to the presentation time of the auxiliary information signal to be written in the first location, as disclosed in FIG. 4. It should be noted that the writing unit 12 could be arranged to generate a master file, which is temporarily stored in a storage device. This master file is later on used to generate stamp which is used for mass production of optical discs. The locations in the master file corresponds to locations in the track of the optical disc. In a further embodiment of the invention the second processing unit is adapted to subdivide auxiliary signals of the same type, a type is for example audio streams, graphic stream or subtitle stream, into sequences of auxiliary blocks comprising parts of the respective auxiliary information signals having similar specific presentation times, and the writing means are adapted to write in contiguous locations the blocks of the first number of auxiliary signals comprising the parts of the auxiliary signals having the similar specific presentation time. This embodiment records a record carrier as disclosed in FIG. 4.

FIG. 6 shows a time diagram with the relation between the record carrier to be read and the filling rate of the corresponding buffers. The bar on top of FIG. 6 represents the track of the record carrier and the content of the locations. When reproducing a movie first the blocks of the selected auxiliary files are read from the track and subsequently the blocks of the main file are read. The lower part of FIG. 6 represents the filling rate of the video buffer, audio buffer and sub-title buffer in a reproducing device. As can be seen from FIG. 6, the video buffer is kept as full as possible. Furthermore, a new block of the audio file is read as soon as the audio buffer is almost empty. The same applies for the sub-title buffer. FIG. 6 discloses clearly that as soon as a part of an auxiliary file has to be read the filling rate of the video buffer decreases rapidly. The slope of the lines shows the leak rate of the buffers, which corresponds to the bit-rate of the corresponding stream.

Though the invention is described with reference to preferred embodiments thereof, it is to be understood that these are non-limitative examples. Thus, various modifications are conceivable to those skilled in the art, without departing from the scope of the invention, as defined by the claims. For example, instead of placing blocks of similar type of files, p.e. subtitles, having similar representation time next to each other, the signals with similar bit rate could be placed next to each other.

The use of the verb "to comprise" and its conjugations does not exclude the presence of elements or steps other than those stated in a claim. Furthermore, the use of the article "a" or "an" preceding an element does not exclude the presence of a plurality of such elements. In the claims, any reference signs placed between parenthesis shall not be construed as limiting the scope of the claims. The invention may be implemented by means of hardware as well as software. Several "means" may be represented by the same item of hardware. Furthermore, the invention resides in each and every novel feature or combination of features.

The invention claimed is:

1. An apparatus for recording a main multiplex stream file, comprising a main information signal of a video information signal and a first auxiliary information signal, and auxiliary elementary stream files, comprising further auxiliary information signals, in a track on a record carrier, so as to enable simultaneous presentation of the main information signal and at least one of the further auxiliary information signals, said track comprising a series of physical locations, said apparatus comprising:
    first receiving means for receiving said main multiplex stream file;
    second receiving means for receiving said auxiliary elementary stream files, wherein said auxiliary elementary stream includes (i) a first type of additional elementary streams, wherein a first type additional elementary stream file has a buffer leak bit rate and (ii) a second type of additional elementary streams, wherein a second type additional elementary stream file has a buffer leak bit rate that is less than the buffer leak bit rate of the first type additional elementary stream file;
    first processing means for subdividing the main multiplex stream file into a sequence of main blocks having a main block size, wherein the main multiplex stream file has a buffer leak bit rate that is greater than the buffer leak bit rate of the first type additional elementary stream file, each main block comprising a part of the main information signal having a specific presentation time;
    second processing means for subdividing each auxiliary elementary stream file into a sequence of auxiliary blocks per type, the auxiliary blocks each having a same auxiliary block size, the auxiliary block size being greater than the main block size, each auxiliary block comprising a part of a further auxiliary information signal having a specific presentation time; and
    writing means for interleaved writing in said track of the record carrier, (i) in an initial physical location, at least one block of the second type of auxiliary elementary stream file comprising a part of at least one second type further auxiliary information signal having a specific presentation time, (ii) in a first physical location adjacent the initial physical location, at least one block of the first type of auxiliary elementary stream file comprising a part of at least one first type further auxiliary information signal having said specific presentation time, (iii) in a second physical location, a subsequent block of the corresponding first type of auxiliary elementary stream file, and (iv) in at least one location between the first and second physical locations, at least one block of the main multiplex stream file comprising a part of the main information signal having a presentation time corresponding to the presentation time of the at least one block of the first type further auxiliary information signal to be written in the first physical location, wherein said writing means is further configured:
    (v)(a) for repetitively writing subsequent parts of the main multiplex stream and parts of the corresponding first type of auxiliary elementary stream file contiguously in said track, and
    (v)(b) for writing a subsequent part of the second type of auxiliary elementary stream file at another physical location such that the part of the main multiplex stream file stored in a location preceding the location of the subsequent part of the second type of auxiliary elementary stream file has a presentation time that lies in a presentation time interval of a preceding part of the second type of auxiliary elementary stream file stored in said track, and the part of the main multiplex stream file, stored in a location subsequent said another physical location has a presentation time that lies in the presentation time interval of the subsequent part of the second type of auxiliary elementary stream file stored in a current location of said track.

2. The apparatus as claimed in claim 1, characterized in that a first number of auxiliary elementary stream files comprises a similar type of signals,
    wherein the second processing means subdivides the first number of further auxiliary signals into sequences of auxiliary blocks comprising parts of the respective further auxiliary information signals having similar specific presentation times,
    and wherein the writing means writes in contiguous locations, the blocks of the first number of further auxiliary signals comprising the parts of the further auxiliary signals having the similar specific presentation time.

3. The apparatus as claimed in claim 1 or 2, characterized in that at least one of the further auxiliary information signals is an audio signal.

4. The apparatus as claimed in claim 1 or 2, characterized in that at least one of the further auxiliary information signals is a subtitle signal.

5. The apparatus as claimed in claim 1 or 2, characterized in that at least one of the further auxiliary information signals is a PIP signal.

6. Apparatus as claimed in claim 1 or 2, characterized in that at least one of the further auxiliary signals is a graphics signal.

7. A method of recording a main multiplex stream file, comprising a main information signal of a video information signal and a first auxiliary information signal, and auxiliary elementary stream files, comprising further auxiliary information signals, in a track on a record carrier, so as to enable simultaneous presentation of the main information signal and at least one of the further auxiliary information signals, said track comprising a series of physical locations, said method comprising the steps of:

receiving said main multiplex stream file;

receiving said auxiliary elementary stream files, wherein said auxiliary elementary stream includes (i) a first type of additional elementary streams, wherein a first type additional elementary stream file has a buffer leak bit rate and (ii) a second type of additional elementary streams, wherein a second type additional elementary stream file has a buffer leak bit rate that is less than the buffer leak bit rate of the first type additional elementary stream file;

subdividing the main multiplex stream file into a sequence of main blocks having a main block size, wherein the main multiplex stream file has a buffer leak bit rate that is greater than the buffer leak bit rate of the first type additional elementary stream file, each main block comprising a part of the main information signal having a specific presentation time;

subdividing each auxiliary elementary stream file into a sequence of auxiliary blocks per type, the auxiliary blocks each having a same auxiliary block size, the auxiliary block size being greater than the main block size, each auxiliary block comprising a part of a further auxiliary information signal having a specific presentation time; and writing interleaved in said track of the record carrier, (i) in an initial physical location, at least one block of the second type of auxiliary elementary stream file comprising a part of at least one second type further auxiliary information signal having a specific presentation time, (ii) in a first physical location adjacent the initial physical location, at least one block of the first type of auxiliary elementary stream file comprising a part of at least one first type further auxiliary information signal having said specific presentation time, (iii) in a second physical location, a subsequent block of the corresponding first type of auxiliary elementary stream file, and (iv) in at least one location between the first and second physical locations, a block of the main multiplex stream file comprising a part of the main information signal having a presentation tune corresponding to the presentation time of the at least one block of the first type further auxiliary information signal to be written in the first physical location, wherein writing further includes:

(v)(a) repetitively writing subsequent parts of the main multiplex stream and parts of the corresponding first type of auxiliary elementary stream file contiguously in said track, and (v)(b) writing a subsequent part of the second type of auxiliary elementary stream file at another physical location such that the part of the main multiplex stream file stored in a location preceding the location of the subsequent part of the second type of auxiliary elementary stream file has a presentation time that lies in a presentation time interval of a preceding part of the second type of auxiliary elementary stream file stored in said track, and the part of the main multiplex stream file, stored in a location subsequent said another physical location has a presentation time that lies in the presentation time interval of the subsequent part of the second type of auxiliary elementary stream file stored in a current location of said track.

8. The method as claimed in claim 7, characterized in that a first number of auxiliary elementary stream files comprises a similar type of signals, wherein the method further comprises the steps of:

subdividing the first number of further auxiliary signals into sequences of auxiliary blocks comprising parts of the respective further auxiliary information signals having similar specific presentation times; and writing, in contiguous locations, the blocks of the first number of further auxiliary signals comprising the parts of the further auxiliary signals having the similar specific presentation time.

9. A non-transitory, machine readable record carrier containing information for controlling the operation of a processor during playback in a playback device, the record carrier carrying a main multiplex stream file, comprising a main information signal of a video information signal and a first auxiliary information signal, and auxiliary elementary stream files, comprising further auxiliary information signals, in a track on the record carrier, so as to enable simultaneous presentation of the main information signal and at least one of the further auxiliary information signals, said track comprising a series of interleaved physical locations, characterized in that:

the main multiplex stream file is subdivided into a sequence of main blocks having a main block size, each block comprising a part of the main information signal having a specific presentation time;

each of the auxiliary elementary stream files is subdivided into a sequence of auxiliary blocks per type, the auxiliary blocks each having a same auxiliary block size, the auxiliary block size being greater than the main block size, each block comprising a part of a further auxiliary information signal having a specific presentation time, wherein said auxiliary elementary stream includes (i) a first type of additional elementary streams, wherein a first type additional elementary stream file has a buffer leak bit rate and (ii) a second type of additional elementary streams, wherein a second type additional elementary stream file has a buffer leak bit rate that is less than the buffer leak bit rate of the first type additional elementary stream file, and wherein the main multiplex stream file has a buffer leak bit rate that is greater than the buffer leak bit rate of the first type additional elementary stream file;

an initial physical location including at least one block of the second type of auxiliary elementary stream file comprising a part of at least one second type further auxiliary information signal having a specific presentation time, a first physical location adjacent the initial physical location comprising at least one block of the first type of auxiliary elementary stream file comprising a part of at least one first type further auxiliary information signal having said specific presentation time;

a second physical location comprising a subsequent block of the corresponding first type of auxiliary elementary stream file; and a physical location between the first and second physical locations comprising a block of the main multiplex stream file comprising a part of the main information signal having a presentation time corresponding to the presentation time of the at least one block of the first type further auxiliary information signal written in the first physical location, wherein further locations include:

repetitively written subsequent parts of the main multiplex stream and parts of the corresponding first type of auxiliary elementary stream file contiguously in said track, and another physical location having a subsequent part of the second type of auxiliary elementary stream file such that the part of the main multiplex stream file stored in a location preceding the location of the subsequent part of the second type of auxiliary elementary stream file has a presentation time that lies in a presentation time interval of a preceding part of the second type of auxiliary elementary stream file stored in said track, and the part of the main multiplex stream file, stored in a location subsequent said another physical location has a presentation time that lies in the presentation time interval of the subsequent part of the second type of auxiliary elementary stream file stored in a current location of said track.

10. A computing device containing information for controlling the operation of a processor in a playback device during playback in a playback device, the record carrier carrying a main multiplex stream file, comprising a main information signal of a video information signal and a first auxiliary information signal, and auxiliary elementary stream files, comprising further auxiliary information signals, in a track on the record carrier, so as to enable simultaneous presentation of the main information signal and at least one of the further auxiliary information signals, said track comprising a series of interleaved physical locations, characterized in that:

the main multiplex stream file is subdivided into a sequence of main blocks having a main block size, each block comprising a part of the main information signal having a specific presentation time;

each of the auxiliary elementary stream files is subdivided into a sequence of auxiliary blocks per type, the auxiliary blocks each having a same auxiliary block size, the auxiliary block size being greater than the main block size, each block comprising a part of a further auxiliary information signal having a specific presentation time, wherein said auxiliary elementary stream includes (i) a first type of additional elementary streams, wherein a first type additional elementary stream file has a buffer leak bit rate and (ii) a second type of additional elementary streams, wherein a second type additional elementary stream file has a buffer leak bit rate that is less than the buffer leak bit rate of the first type additional elementary stream file, and wherein the main multiplex stream file has a buffer leak bit rate that is greater than the buffer leak bit rate of the first type additional elementary stream file;

an initial physical location including at least one block of the second type of auxiliary elementary stream file comprising a part of at least one second type further auxiliary information signal having a specific presentation time, a first physical location adjacent the initial physical location comprising at least one block of the first type of auxiliary elementary stream file comprising a part of at least one first type further auxiliary information signal having said specific presentation time;

a second physical location comprising a subsequent block of the corresponding first type of auxiliary elementary stream file; and a physical location between the first and second physical locations comprising a block of the main multiplex stream file comprising a part of the main information signal having a presentation time corresponding to the presentation time of the at least one block of the first type further auxiliary information signal written in the first physical location, wherein further locations include:

repetitively written subsequent parts of the main multiplex stream and parts of the corresponding first type of auxiliary elementary stream file contiguously in said track, and another physical location having a subsequent part of the second type of auxiliary elementary stream file such that the part of the main multiplex stream file stored in a location preceding the location of the subsequent part of the second type of auxiliary elementary stream file has a presentation time that lies in a presentation time interval of a preceding part of the second type of auxiliary elementary stream file stored in said track, and the part of the main multiplex stream file, stored in a location subsequent said another physical location has a presentation time that lies in the presentation time interval of the subsequent part of the second type of auxiliary elementary stream file stored in a current location of said track.

* * * * *